(12) United States Patent
Yadav et al.

(10) Patent No.: US 11,775,394 B2
(45) Date of Patent: Oct. 3, 2023

(54) SIZE-BASED ORGANIZATION OF BACKUP FILES WITHIN AN OBJECT STORAGE FOR EFFICIENT OBJECT RE-TIERING

(71) Applicant: EMC IP Holding Company LLC, Hopkinton, MA (US)

(72) Inventors: Sunil Yadav, Bangalore (IN); Shelesh Chopra, Bangalore (IN); Ravi Vijayakumar Chitloor, Bengaluru (IN)

(73) Assignee: EMC IP Holding Company LLC, Hopkinton, MA (US)

(*) Notice: Subject to any disclaimer, the term of this patent is extended or adjusted under 35 U.S.C. 154(b) by 87 days.

(21) Appl. No.: 17/374,688

(22) Filed: Jul. 13, 2021

(65) Prior Publication Data
US 2022/0382644 A1 Dec. 1, 2022

(30) Foreign Application Priority Data
May 27, 2021 (IN) .............................. 202141023565

(51) Int. Cl.
*G06F 16/11* (2019.01)
*G06F 11/14* (2006.01)

(52) U.S. Cl.
CPC ........ *G06F 11/1458* (2013.01); *G06F 16/128* (2019.01); *G06F 2201/84* (2013.01)

(58) Field of Classification Search
CPC . G06F 11/1458; G06F 16/128; G06F 2201/84
USPC .......................................................... 707/649
See application file for complete search history.

(56) References Cited

U.S. PATENT DOCUMENTS

| | | | | |
|---|---|---|---|---|
| 7,197,520 | B1 * | 3/2007 | Matthews | G06F 11/1458 |
| 9,665,487 | B1 * | 5/2017 | Basham | G06F 11/1451 |
| 11,175,999 | B2 * | 11/2021 | Hardy | G06F 3/0685 |
| 2020/0174893 | A1 * | 6/2020 | Tormasov | G06F 11/1464 |
| 2022/0066882 | A1 * | 3/2022 | Wang | G06F 3/0608 |

\* cited by examiner

*Primary Examiner* — Robert W Beausoliel, Jr.
*Assistant Examiner* — Lauren Zannah Ganger
(74) *Attorney, Agent, or Firm* — Dergosits & Noah LLP; Todd A. Noah (57) ABSTRACT

Described is a system (and method) for size-based organization of backup files within an object storage for efficient object re-tiering. The system may perform a specialized process to re-tier objects stored within an object storage by organizing backup files into individual or shared objects based on a backup file size. Accordingly, the system may initiate a re-tiering of objects immediately after performing an incremental backup to improve storage efficiency while at the same time retaining the ability to synthetically perform a full restore.

20 Claims, 5 Drawing Sheets

SIZE-BASED ORGANIZATION OF BACKUP FILES WITHIN AN OBJECT STORAGE FOR EFFICIENT OBJECT RE-TIERING

CLAIM OF PRIORITY

This application claims priority to India Patent Application No. 202141023565, filed May 27, 2021, the contents of which is hereby incorporated by reference in their entirety.

TECHNICAL FIELD

This disclosure relates to cloud-based storage systems, and more particularly, managing backup data stored on a cloud-based object storage.

BACKGROUND

Cloud-based storage systems (or on-demand storage systems) may provide various tools that are crucial for enterprise level network clients. For example, clients may rely on such systems for data protection and recovery services that efficiently back up and recover data in the event of data loss to allow business applications to remain in service or quickly come back up to service. Clients may rely on such cloud-based storage systems to leverage the benefits such as cost efficiency (e.g. pay per usage models) and scalability. These cloud-based systems may implement an object-based storage architecture, and accordingly, client data such as backup data may be stored as objects (or data objects). To limit the amount of data transferred during a backup procedure, the client data may be stored using an incremental backup technique. For example, only the changes to the client data since the previous backup will be stored as part of the incremental backup. Accordingly, large amounts of data from previous backups may need to be preserved on the storage system in order to perform a full recovery of data. The need to store such large amounts of data, however, results in increased storage costs. Moreover, despite the ability to store data on different storage tiers with varying associated costs, the native capabilities (or tools) provided by cloud-based systems to allocate data to these storage tiers are often rudimentary. Moreover, such native capabilities may not adequately address data being stored as part of an incremental backup infrastructure. Accordingly, there is a continued need to efficiently allocate data to various storage tiers when storing backup data to a cloud-based storage system.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a system (and method) for size-based organization of backup files within an object storage for efficient object re-tiering. The system may perform a specialized process to re-tier objects stored within an object storage by organizing backup files into individual or shared object based on a backup file size. In some embodiments, the system may be implemented as part of an incremental backup infrastructure. For example, in order to conserve storage space, a backup service may perform incremental backups when storing client backup data to the object storage. However, the backup application may perform a full restore of the client data to a point-in-time of any incremental backup by reconstructing (e.g. synthetically) the client data as if a full backup was performed. Accordingly, the system may intelligently re-tier objects such that the system retains the ability to perform such a reconstruction. Cloud-based object storages may provide native capabilities to re-tier objects based on an expiration. However, instead of merely re-tiering objects exclusively on an expiration, the system may initiate a re-tiering of objects immediately after performing a backup (e.g. prior to performing a subsequent backup) to improve storage efficiency while at the same time retaining the ability to perform a full restore.

To provide such a capability, the system may receive a request to back up files stored on a client device to a cloud-based object storage. For example, the object storage may include a first storage tier associated with a first storage cost and a second storage tier associated with a second storage cost less than the first storage cost. The system may identify, amongst the files stored on the client device, a first set of files that are each larger than a predetermined size, and a second set of files that are each smaller than the predetermined size. Accordingly, the system may identify one or more combination of files from the second set of files that when grouped together are within a range of the predetermined size. The system may then perform a first backup of the files stored on the client device by storing, on the first storage tier of the object storage, a backup of each file of the first set of files as an individual object, and a backup of each of the combinations of files from the second set of files as a shared object. As a result, the system may initiate a re-tiering of objects by moving the individual objects from the first storage tier to the second storage tier. This allows backup files stored as part of a shared object to be efficiently referenced as part of an incremental backup infrastructure while at the same decreasing storage costs by storing larger backup files to a lower cost storage tier.

In some embodiments, such a system may be provided within an operating environment. An example of such an operating environment is further described herein with reference to FIG. 1. However, in general, embodiments of the disclosure may include and/or be implemented in an operating environment including a cloud-based services environment that may be, or include, a data protection operating environment that includes data protection and backup services. For example, at least some functionality may be provided by, or implemented in connection with, various platforms such as the Data Domain™ data protection platform provided by Dell EMC Corporation (Dell EMC), and associated systems, methods, and components, although use of this particular platform is provided only by way of illustration and is not required.

In some embodiments, the operating environment may take the form of a cloud-based environment. However, embodiments of the disclosure may also be implemented for an on-premises environment, and hybrid environments that include public and private elements, as well as any other type of environment. In addition, any of these cloud environments, or other operating environments, may take the form of an operating environment that is partly, or completely, virtualized. The environment may include one or more host devices that each host one or more applications used by a client of the environment. As such, a particular client may employ, or otherwise be associated with, one or more instances of each of one or more applications. In general, the applications employed by the clients are not limited to any particular functionality or type of functionality.

Any of the devices, including the clients, servers, and hosts, in the operating environment can take the form of software, physical machines, or virtual machines (VM), or any combination thereof, though no particular device implementation or configuration is required for any embodiment. Similarly, storage components (or devices) such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term "data" is intended to be broad in scope. Accordingly, data may include data objects (or objects), data segments such as may be produced by data stream segmentation processes, data chunks, data blocks, atomic data, emails, files, contacts, directories, sub-directories, volumes, etc. In addition, the storage of data can employ any suitable storage technique, infrastructure, or hardware (e.g. Solid State Drive (SSD), Hard Disk Drive (HDD)), which may include storage systems provided by a cloud service provider.

Figure 1:
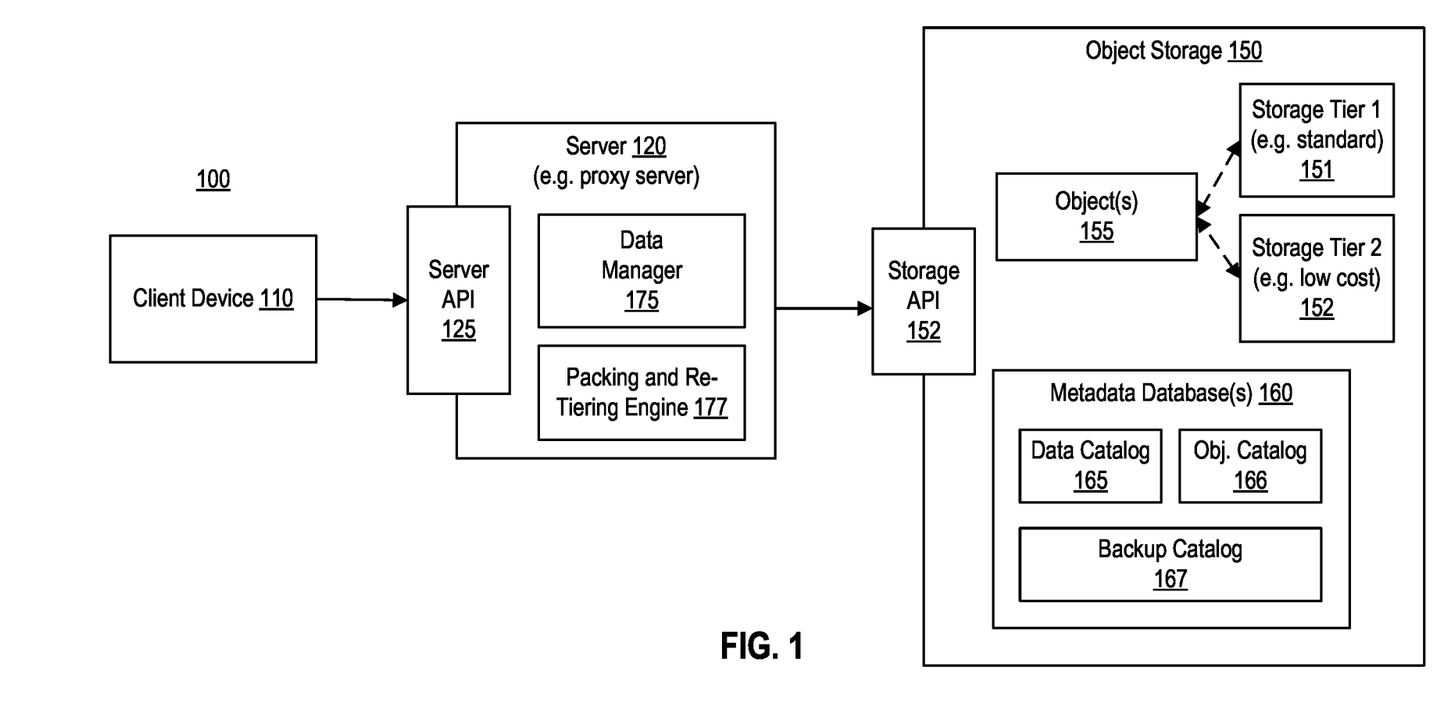
FIG. 1 is a block diagram illustrating an example of an operating environment that may be used in conjunction with one or more embodiments of the disclosure.

More specifically, and with reference to FIG. 1, shown is a block diagram illustrating an example of an operating environment 100 for managing backup data on an object storage according to one or more embodiments of the disclosure. It should be noted that the components of operating environment 100 may interact via a network, which may be any type of wired or wireless network including a local area network (LAN), a wide area network (WAN), or a direct communication link, or other suitable connection.

As shown, the environment 100 may include a client device 110, a server (e.g. a cloud-based component/gateway and/or a proxy server) 120, and a cloud-based (or on-demand) object storage 150. In general, the server 120 may act as an intermediary between the client device 110 and the object storage 150. In some embodiments, the client device 110 may be associated with a client that is a customer (or subscriber, client, tenant, user, account, etc.) of a backup service or platform (e.g. software/platform-as-a-service) provided by a first entity, as well as a customer of an object storage or service (e.g. software/platform-as-a-service) provided by a different (or second) entity. For example, the server 120 may be provided as part of the backup service provided by the first entity (e.g. Dell EMC), and the object storage 150 may be provided as part of a cloud-based object storage service provided by the different entity (e.g. Amazon S3, Microsoft Azure, IBM Cloud Object Storage, Google Cloud Storage, etc.). In some embodiments, the first entity providing the backup service may also provide (or host) the client device 110 (e.g. as part of a VM).

The client device (or client system) 110 may be associated with client data (or data) that is backed up to the object storage 150. The object storage (or object storage system) 150 may include a persistent object storage that implements a storage architecture that manages data as an object(s) 155. For example, each object 155 stored by the object storage 150 may include data, meta-data, and/or a globally unique identifier for the object. In some embodiments, an object may include a unit of storage used by a cloud-based object storage and may include a collection of objects that may be referred to as containers, buckets, and the like (e.g. depending on the cloud-based storage provider). For example, these containers or buckets may be associated with a policy that determines what actions can be performed in association with the objects stored therein. As shown, the object storage 150 may include various storage tiers including storage tier 1 151, and storage tier 2 152. Accordingly, objects 155 (e.g. backed-up client data) may be distributed amongst these storage tiers (or classes). For example, each storage tier may have different performance characteristics such as latency, storage capacity, bandwidth, durability, etc., and thus, may be associated with different storage costs. For example, the storage cost may include a time-based cost per unit of storage (e.g. GB/month), retrieval costs, performance costs, etc. For instance, higher performance tiers may be associated with increased costs. For example, storage tier 1 151 may be a standard (or high performance) storage tier that is associated with a first storage cost (or cost per unit of storage), and storage tier 2 152 may be an archival or low-cost storage tier that is associated with a second storage cost (or cost per unit of storage). For example, the storage cost (e.g. GB/month) associated with storage tier 2 152 may be lower than the storage cost associated with storage tier 1 151. Thus, efficiently storing data on a lower tier storage may provide substantial cost savings to a subscriber (e.g. a backup service provider, or user) of the cloud-based storage service. For example, storage tier 1 151 may have a cost of 2.3 cents (or $0.023) per GB/month, while storage tier 2 152 may have a cost of 0.4 cents (or $0.004) per GB/month. Accordingly, re-tiering data to storage tier 2 152 would result in a significant reduction in storage costs. It should be noted that other storage costs (or fees) such as access fees or bandwidth fees may also be reduced using a lower cost storage tier. In addition, although only two storage tiers are shown, additional storage tiers with varying costs are also contemplated.

The client device 110 may use the server 120 as an intermediary for managing client backup data stored on the object storage 150. In some embodiments, the server 120 may include, or work in conjunction with, various backup components (e.g. products) that can perform backup operations across physical and virtual environments. These backup components (e.g. backup application, backup appliance, backup server, etc.) can be implemented in various forms, such as a virtual, physical, or native public cloud appliance to fit the requirements of a particular configuration, and can be used with various types of data protection environments, including public and private object storage clouds. The server 120 may also provide enhanced security by being a single secure point of access to data stored externally on the object storage 150. For example, a client device 110 may implement a certain network configuration (e.g. firewall) that limits external access to the client environment. Such a network configuration may be customized to authorize external access to the client device 110 only by the server 120 and not the object storage 150 directly. In addition, the server 120 may also allow the client device 110 to offload resource intensive data management processing. For example, the server 120 may handle backup-related data processing before storing data into the object storage 150. Accordingly, the server 120 may provide advantages over traditional proxy servers that merely forward data to the object storage 150. In addition, the server 120 may be an application or hardware component remote from the client device 110 (e.g. as part of a cloud-based service). Accordingly, the server 120 may be scalable such that it may perform data operations in parallel for multiple client devices 110 and for multiple object storages 150.

As described, the server 120 may act as an intermediary for communications between the client device 110 and an object storage 150. For example, these communications may include requests by the client device 110 to perform data operations on the object storage 150, which are routed through the server 120. For example, the client device 110 may provide (or send, transmit, etc.) client data (or data) to the server 120 using a server API 125. The server 120 may then initiate (or perform, execute, etc.) a corresponding storage operation directly on the object storage using the storage API 152. In some embodiments, the server API 125 may be a REST API that includes a common set of operations that correspond to various data-related operations on the object storage 150. For example, the server API 125 may include operations allowing a client device 110 to store and recover client data backed up to the object storage 150. For example, the server API 125 may allow the client device 110 to read data from an object storage 150, write data to an object storage 150, copy data within the object storage 150, and various other operations for managing data. In some embodiments, the server API 125 may include operations for re-tiering data (e.g. objects) stored on the object storage 150. For example, a re-tiering operation may move an object from a first storage tier (e.g. storage tier 1 151) to a second (or lower) storage tier (e.g. storage tier 2 152). It should be noted that the same set of operations provided by the server API 125 may be used by the client device 110 irrespective of the type of object storage 150. To provide such object-storage-agnostic functionality, the server 120 may include a function library that includes object-storage-specific functions. Accordingly, the server 120 may use such object-storage-specific functions to interact directly with the object storage 150. For example, the server 120 may initiate data operations directly on the object storage 150 by calling various methods (functions, operations, etc.) of the storage API 152. In some embodiments, the storage API 152 may include only a standard set of storage operations. Accordingly, the server 120 may implement efficient storage and recovery procedures as further described herein.

As described, the server 120 may manage backed-up client data stored on the object storage 150. Accordingly, the server 120 may include a data manager 175. The data manager (or manager) 175 may coordinate (or manage, orchestrate, execute, automate, etc.) the initiation (or execution) of storage and recovery operations on the object storage 150. In some embodiments, the data manager 175 may provide a user interface that allows a user to perform and configure various settings associated with managing backup data. For example, the user interface may allow a user to configure (e.g. input) various settings such as backup rules (e.g. storage limits, storage cost limits, storage ratios, etc.) associated with re-tiering data stored on the object storage 150 as further described herein. In addition, the data manager 175 may direct (or control, initiate, etc.) other components of the operating environment 100 to perform various processes as further described herein.

The server 120 may also include a packing and re-tiering engine 177 (or manager, component, etc.). The packing and re-tiering engine 177 may work in conjunction with, or be part of, the data manager 175. The engine 177 may analyze data to be backed up to the object storage 150 and determine how the data should be packed (or arranged) within objects based on the specialized object size. In addition, the engine 177 may monitor objects stored on the object storage 150 detect when certain conditions are present. When such conditions are detected, the server 120 may initiate a re-tiering of data (e.g. objects) as further described herein.

To further improve potential storage and recovery efficiency, the server 120 may leverage a specialized metadata database 160. The metadata database 160 may be maintained by the server 120. The metadata database 160 may include an embedded database. For example, the metadata database 160 may be created by the server 120 using a particular software library (e.g. SQLite library). The metadata database 160 may reside on the object storage 150, the server 120, and/or another component (e.g. cloud-based component) such that it is accessible by the server 120. For example, when the metadata database 160 resides on the object storage 150, the server 120 may access (e.g. update) the metadata database 160 by accessing the storage API 152. In addition, portions of the metadata database may be cached on a memory (or storage) of the server 120 to further improve performance of various backup or restore operations.

The metadata database 160 may store metadata associated with client data stored on the client device 110 and/or backed up to the object storage 150. The metadata database 160 may also store various types of backup information associated with the backed-up client data and/or backups performed.

For example, the metadata database 160 may include a data catalog (or table, database, index, etc.) 165. The data catalog 165 may store information associated with the data stored as part of each backup. For example, the information may include a point-in-time the client data was backed up, a storage location of the backed-up client data (including storage tier), an object ID to which the backed-up client data is stored, and various other types of information. Accordingly, a data catalog 165 (or instance thereof) may be updated after each backup is performed. The data catalog 165 may also store information associated with objects 155 that store backup data such as data IDs of backup data stored by an object, data offsets (or storage location information within object), creation date, and other types of information that may be associated with an object 155. In some embodiments, the data catalog 165 may be maintained for a particular account (e.g. user, client, customer, etc.) associated with the object storage 150. The data catalog 165 may also store various types of backup information associated with the backed-up client data.

The metadata database 160 may include an object catalog (or table, database, index, etc.) 166 that stores information associated with the objects that store backup data. For example, the object catalog 166 may include a storage location including a storage tier indicating where particular object 155 is stored on the object storage 150.

The metadata database 160 may also include a backup catalog (or index, table, database, etc.) 167 that stores information associated with each backup performed to the object storage 150. For example, the backup catalog 167 may include backup times specifying when each backup was performed, a backup expiration time, a type of backup (e.g. full or incremental), and any other information that may be associated with performing a backup. In addition, the backup catalog 167 may also include a list of objects required to perform a full restore to each of the backup times.

Figure 2:
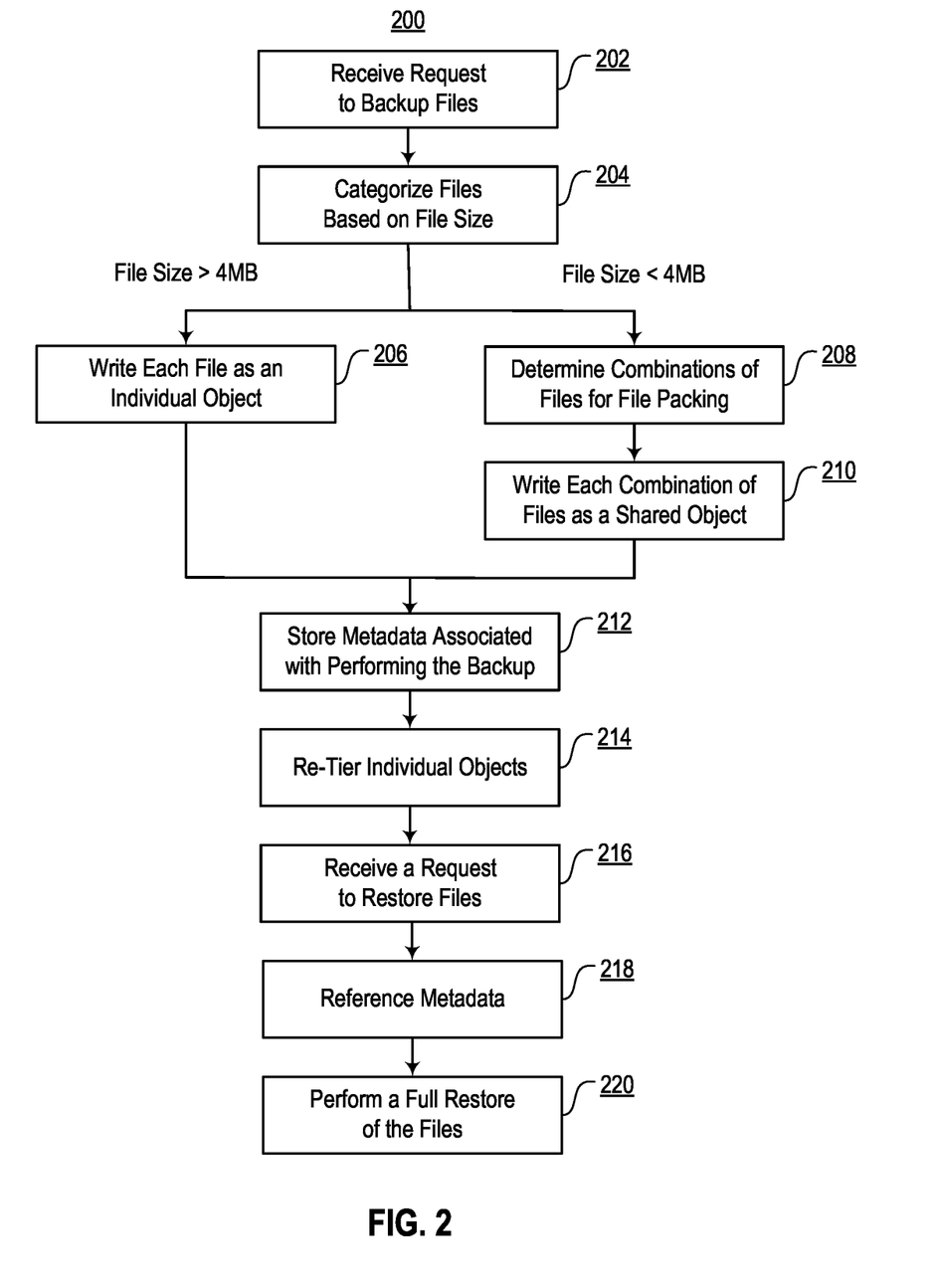
FIG. 2 is a flow diagram illustrating an example process of categorizing files when performing a backup for efficient re-tiering according to one or more embodiments of the disclosure.

FIG. 2 is a flow diagram illustrating an example process of categorizing files when performing a backup for efficient re-tiering according to one or more embodiments of the disclosure. Process 200 may use processing logic, which may include software, hardware, or a combination thereof. For example, process 200 may be performed by a system including one or more components described in operating environment 100 (e.g. server 120, manager 175, etc.).

In 202, the system (e.g. server 120) may receive a request to back up files. For example, the system may receive a request (or instruction) to backup files stored on a client device (e.g. client device 110). In 204, the system may categorize the files to be backed up based on their size (or file size). The system may categorize these files based on a predetermined size (or threshold size). In some embodiments, the predetermined size may be based on a specialized (or near optimal) size for storing data and/or objects when performing data operations. For example, if the system stores files that are too large, processing performance may be hindered based on the amount of data to transfer and/or traverse. However, if the system stores files that are too small, processing performance may suffer from the increased number of files required to be read/written for a given amount of data and/or the associated I/O requirements for such a large number of files. As shown, in some embodiments, the system may set the predetermined size to approximately 4 MB, which may be a specialized size for organizing data within a deduplication storage system. Accordingly, for files that are categorized as having a file size greater than 4 MB, in 206, the system writes each of these files as an individual object. For files that are categorized as having a file size less than 4 MB, in 208, the system may determine combinations of files for performing a file packing. For example, the system may group files together such that the combined (or total) file size of the group is approximately 4 MB. In some embodiments, the system may determine file combinations in which the combined group of files have a total size within a range of the predetermined size (e.g. within a range of 4 MB). Accordingly, in 210, the system may write (or store) each of these combinations of files as a shared object. Irrespective of whether a backup of the files (i.e. backup data) is stored as part of an individual object or a shared object, in 212, the system may store metadata associated with performing the backup. In some embodiments, this metadata may be stored as part of a metadata database (e.g. metadata database 160), which may include metadata stored as part of a data catalog (e.g. data catalog 165), object catalog (e.g. object catalog 166), and/or backup catalog (e.g. backup catalog 167). An example of performing a backup of files and the associated metadata that may be stored is described further herein with reference to FIG. 3.

Continuing with process 200, after the system has written (e.g. stored) a backup of the files to the object storage (e.g. performed a backup of the file), the system may reallocate objects within the object storage to reduce storage costs. In particular, in 214, the system may re-tier the individual objects by moving individual objects to a lower cost storage tier. As described, the system may re-tier individual objects without unduly limiting the ability to perform full synthetic backups by storing specialized metadata. Accordingly, in 216, the system may receive a request to restore files, and in response, in 218, the system may reference the metadata. For example, the system may reference the metadata to determine which individual objects (if any) need to be retrieved from a lower storage tier to perform a restore. Thus, in 220, the system may perform a full restore of the files. For example, the system may retrieve backup data stored by individual objects from a lower storage tier as part of performing the restore. In other words, the system maintains the ability to perform a full restore (e.g. provide all of the necessary data to fully restore the files) despite performing incremental backups and re-tiering backup data within an object storage.

Figure 3:
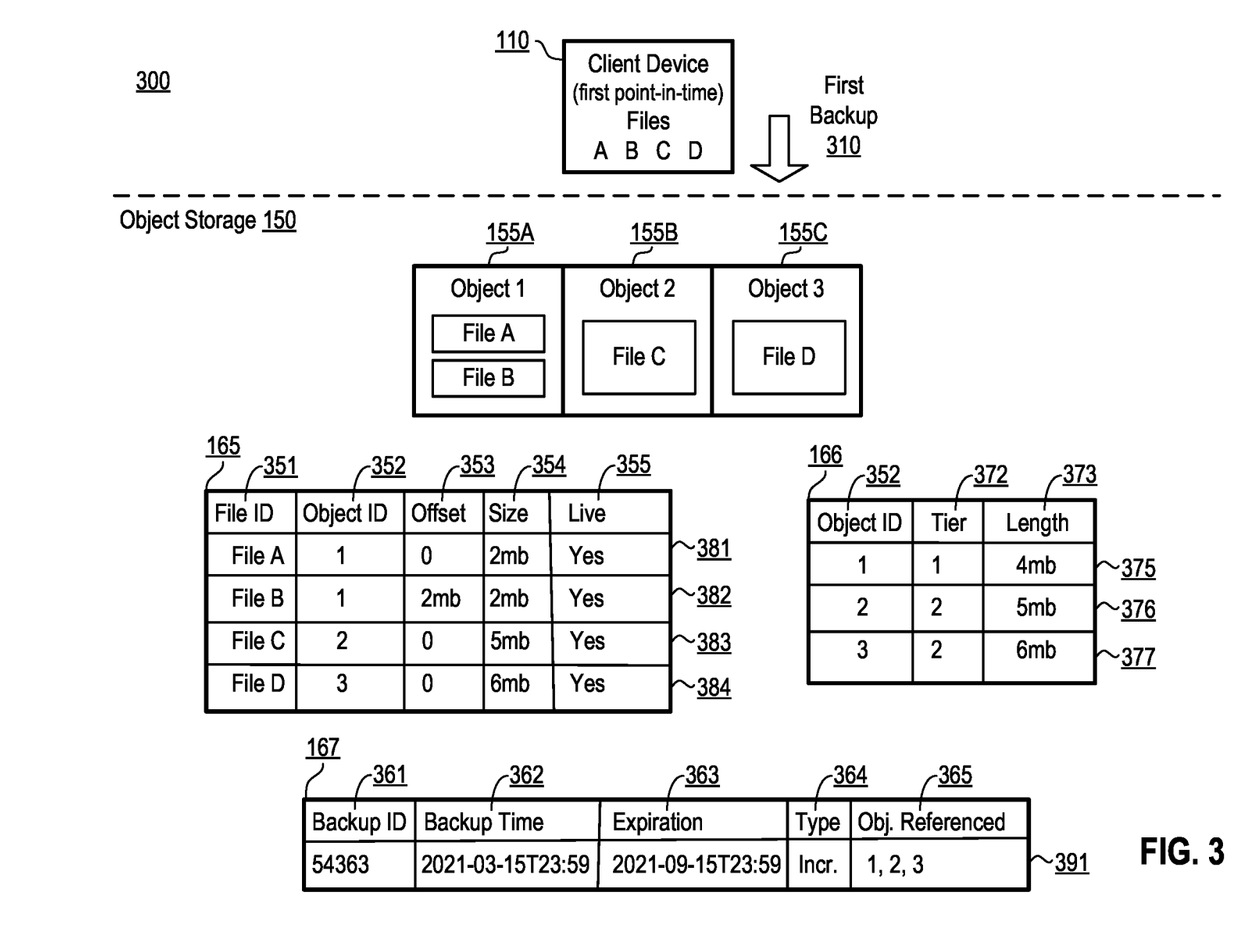
FIG. 3 is a diagram illustrating an example of storing backup data within one or more objects and storing associated metadata within a metadata database according to one or more embodiments of the disclosure.

FIG. 3 is a diagram 300 illustrating an example of storing backup data within one or more objects 155 and storing associated metadata within a metadata database according to one or more embodiments of the disclosure.

As shown in diagram 300, the client device 110 at a first point-in-time stores Files A, B, C, and D. Accordingly, as part of the first backup 310, which in this example is an incremental backup, the server stores the files within newly created objects 155A, 155B, and 155C of the object storage 150. In other words, objects 155A, 155B, and 155C may be associated with the first backup 310 and/or the first point-in-time. As described, the server may perform a grouping (or packing, combining, organizing, etc.) of files based on a predetermined size for an object 155, which may be specialized for storage and processing efficiency. In some embodiments, the predetermined size for an object may be set to 4 MB (or approximately 4 MB) as shown in this example. Accordingly, the server may determine a combination of files that when grouped together are within a range of (or approximately equal to) 4 MB. Thus, the server may attempt to pack files that are smaller than 4 MB into an object 155 such that the object 155 stores approximately 4 MB of data.

For example, the server may store (e.g. pack) files A and B, which are approximately 2 MB each in size, within object 1 155A. In contrast, the system may store files C and D, which are approximately 5 MB and 6 MB each in size, within their own objects; object 2 155B and object 3 155C respectively. Accordingly, object 1 155A would be considered a shared object since it stores a group of files, and object 2 155B and object 3 155C would be considered individual objects as they each store a single file.

As described, the server may store metadata associated with the backed-up files as part of a metadata database. In particular, the metadata associated with the backed-up files may be stored as part of a data catalog 165. As shown, the data catalog 165 may store various types of information including a file identifier (ID) 351, an object identifier (ID) 352, an offset 353, the size 354 of the file, and whether the file is live 355.

More specifically, in the example of diagram 300, the server stores entries 381-384 that correspond to files A, B, C, and D respectively. As shown, each of the entries 381-384 identifies the object (e.g. via object ID 352) in which the corresponding file (e.g. identified by file ID 351) is stored. Files A and B are both stored in object 1 155A, and accordingly, as shown in the data catalog 165, entry 382 specifies a 2 MB offset for File B, which corresponds to the size of File A (e.g. 2 MB). Accordingly, when retrieving File B, the server may use the offset to efficiently locate File B within object 1 155A. In addition, each of these entries may be associated with the first backup 310 and/or a point-in-time of the first backup 310 (e.g. a first point-in-time). For example, although not shown, the data catalog 165 may also include a backup identifier (ID) field indicating that files A-D were backed up as part of the first backup 310. For instance, entries 381-384 may each store a value (e.g. 54363) that corresponds to the first backup 310 (e.g. as shown in the backup catalog 167).

As described, the server may also store metadata associated with an object 155 as part of a metadata database. In particular, the metadata associated with an object 155 may be stored as part of an object catalog 166. As shown, the object catalog 166 may store various types of information including an object identifier (ID) 352, an identifier for a storage location (or Tier ID) 372, and an object length 373.

More specifically, in the example of diagram 300, after a re-tiering is performed (as further described herein) the server stores entries 375, 376, and 377 that correspond to object 1 155A, object 2 155B, and object 3 155C, respectively. As shown, each of the entries 375-377 identifies the object (e.g. via object ID 351), and lengths of the object or total size of the files stored therein (via the object length 373). In addition, the storage location (or Tier ID) for entries 376 and 377 indicate that corresponding objects 2 155B and 3 155C are re-tiered to storage tier 2 since they are individual objects (e.g. only store a single file). In contrast, entry 375 indicates that corresponding object 1 155A is stored in storage tier 1 since it is a shared object, and thus, not subject to re-tiering.

Additionally, as described, the server may store metadata associated with each backup as part of the metadata database. In particular, the metadata associated with each backup may be stored as part of a backup catalog 167. For example, the server may update the backup catalog 167 in response to each backup performed. As shown, the backup catalog 167 may include a backup identifier (ID) 361, a backup time 362, backup expiration 363, backup type 364, and a referenced object list 365. The backup ID 361 may uniquely identify the backup performed. The backup time 362 may be a time associated with the performed backup. For example, the backup time 362 may be a point-in-time of when the backup was performed. The backup expiration 363, which may be user-configurable, may indicate when the backup files (or objects) associated with a backup is deemed expired (e.g. for deletion). The backup type 364 may indicate whether the backup performed was a full or incremental backup. The referenced object list 365 may include a list of objects referenced by a particular backup. For example, the objects referenced by a particular backup may indicate which objects are required to perform a full restore (or recovery) to the point-in-time of the corresponding backup.

More specifically, as shown in the example of diagram 300, in response to performing the first backup 310, the server may update the backup catalog 167 to include (or add, create, etc.) entry 391, which is associated with the first backup 310. As shown, entry 391 includes a unique identifier "54363" as the backup ID 361. In some embodiments, the backup ID 361 may be linked to (or referenced by, associated with, etc.) entries in the data catalog 165 that correspond to the first backup 310 (e.g. entries 381-384). As shown, entry 391 indicates that the first backup 310 expires after 6 months (e.g. expiration 363 shown as 2021-09-15T23:59, which is 6 months after the backup time 362 shown as 2021-03-15T23:59). Entry 391 also indicates that the first backup 310 was an incremental backup (e.g. backup type 364 specifies incremental backup). In addition, entry 391 includes objects 1, 2, and 3 (e.g. objects 155A, 155B, and 155C) as the referenced object list 365. In other words, to perform a full restore (or recovery) of the files (or client files) to the point-in-time associated with the first backup 310 (e.g. restoration of files A, B, C, and D), the referenced object list 365 indicates that the server would need to retrieve the data stored in objects 155A, 155B, and 155C.

Accordingly, the server may pack data into objects when performing a backup and store specialized metadata allowing the server to leverage various storage tiers of an object storage.

Figure 4:
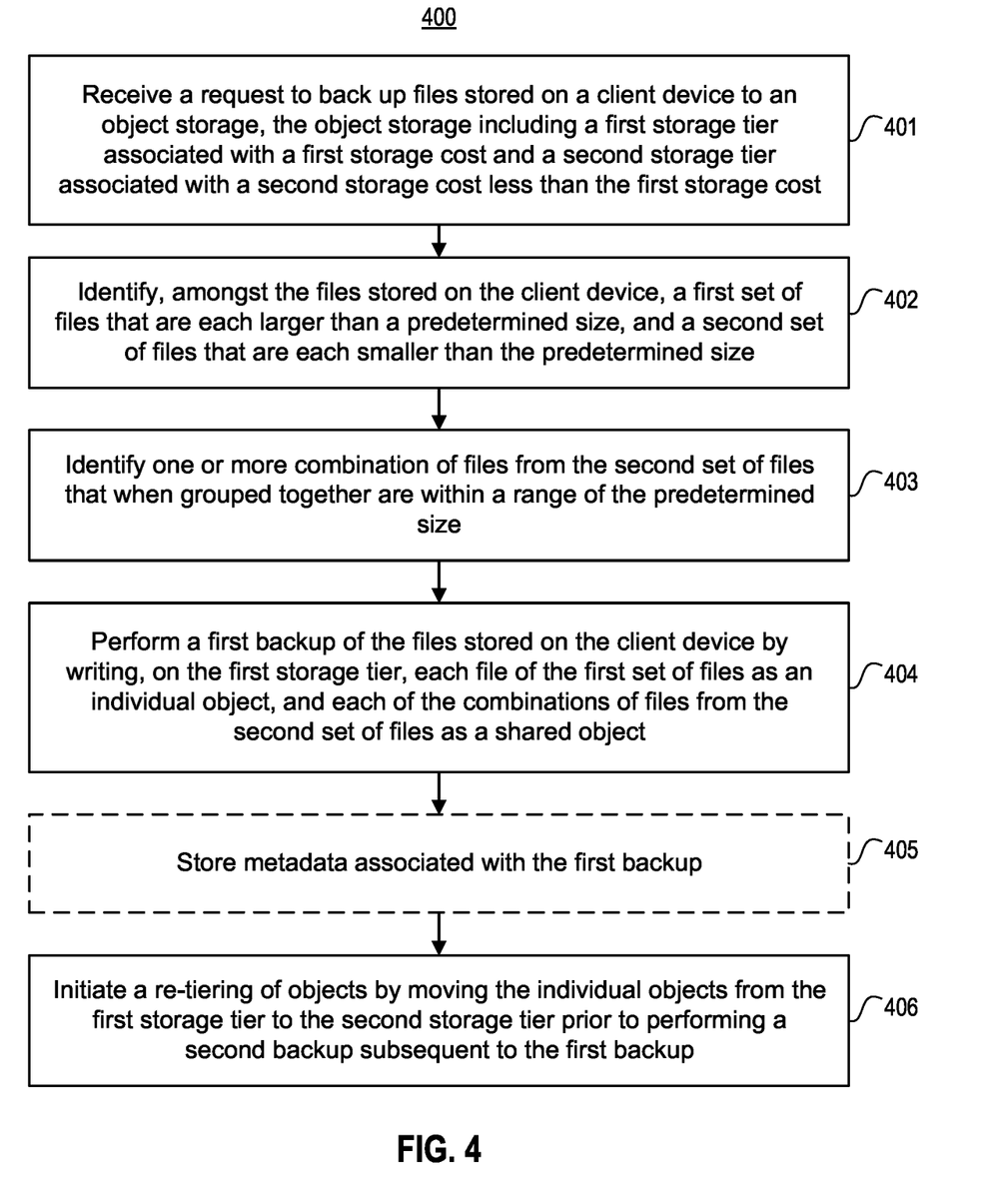
FIG. 4 is a flow diagram illustrating an example method of organizing backup data into individual or shared objects to perform re-tiering within the object storage according to one or more embodiments of the disclosure.

FIG. 4 is a flow diagram illustrating an example method of organizing backup data into individual or shared objects to perform re-tiering within the object storage according to one or more embodiments of the disclosure. Process 400 may use processing logic, which may include software, hardware, or a combination thereof. For example, process 400 may be performed by a system including one or more components described in operating environment 100 (e.g. server 120, manager 175, etc.).

In 401, the system (e.g. server 120) may receive a request to back up files stored on a client device (e.g. client device 110) to an object storage (e.g. object storage 150). As described, the object storage may include a first storage tier (e.g. storage tier 1 151) associated with a first storage cost and a second storage tier (e.g. storage tier 2 152) associated with a second storage cost less than the first storage cost. For example, the first storage tier may have a cost of 2.3 cents (or $0.023) per GB/month, while the second storage tier may have a cost of 0.4 cents (or $0.004) per GB/month.

In 402, the system may identify, amongst the files stored on the client device, a first set of files that are each larger than a predetermined size (or file size), and a second set of files that are each smaller than the predetermined size. For example, if the predetermined size is set to 4 MB (or approximately 4 MB), the system may categorize the files to be backed up into two groups. The two groups would include the files having a size greater than 4 MB as the first set of files, and the files having a size less than 4 MB as the second set of files. In some embodiments, to identify the files, the system may parse metadata stored by the client device that is associated with the files to be backed up. It should be noted that determining whether a file is larger than, or smaller than, the predetermined size includes determining whether the file is larger than or equal to, or smaller than or equal to, the predetermined size.

In 403, the system may identify one or more combination of files from the second set of files that are within a range of the predetermined size. For example, a combination of files would include two or more files whose total size (e.g. sum of sizes) are within a range of the predetermined size. The range may include a percentage (e.g. within 25% of the predetermined size), or an absolute value (e.g. within 1 MB of the predetermined size). For example, if the predetermined size is set at 4 MB, and the range is set at 1 MB, the system may identify combinations of files that when combined total between 3 MB and 5 MB.

In 404, the system may perform a first backup of the files stored on the client device by storing (or writing), on the first storage tier of the object storage, a backup of each file of the first set of files as an individual object, and a backup of each of the combinations of files from the second set of files as a shared object. For example, a backup of each file of the first set of files may be written to its own object, and a backup of each of the combinations of files identified in operation 403, may be written to an object (e.g. shared object). In other words, for the second set of files, the system may create an object that stores two or more files as part of a combination, and thus, the object may be shared by the backup files.

In some embodiments, the individual objects are stored as part of a bucket associated with the client device. For example, the bucket may be named in a self-describing format. For example, in some embodiments, the name of the bucket includes an identifier for the client device and an identifier for a type of data stored by the files on the client device.

In some embodiments, in 405, the system may store metadata associated with the first backup. As described, the system may store metadata as part of a metadata database (e.g. metadata database 160). More particularly, in some embodiments, the system may store, as part of the metadata database, a list of objects (e.g. objects referenced 365) required to perform a full restore to the point-in-time of the first backup. In addition, in some embodiments, the system may store, as part of the metadata database, identifiers (e.g. identifier 372) for the storage locations (e.g. storage tier) of the objects stored by the object storage. In some embodiments, the system may store, as part of the metadata database, an identifiers of the backup of files stored in each of the shared objects (e.g. file ID 351), and offsets (e.g. offset 353) for the backup of files within each of the shared objects.

In 406, the system may initiate a re-tiering of objects by moving the individual objects from the first storage tier to the second storage tier. In some embodiments, the system may perform the re-tiering prior to performing a second backup subsequent to the first backup. In addition, in some embodiments, the re-tiering of objects may be initiated in response to performing the first backup. For example, instead of waiting for objects to expire, or a scheduled garbage collection process, objects may be re-tiered immediately (or substantially immediately) after performing a backup.

In some embodiments, the system may store, as part of the metadata database, an identifier for the second storage tier as a storage location of the individual objects storing the backup of the first set of files. For example, the system may store the storage location (e.g. second storage tier) of the individual objects in response to moving the individual objects from the first storage tier to the second storage tier.

After performing the first backup and re-tiering, the system may also perform an efficient restore.

Accordingly, in some embodiments, the system may receive a request to restore the files stored on the client device to a point-in-time of the first backup, and the system may perform a full restore of the first set of files and the second set of files. In some embodiments, the restore may include retrieving the backups of the first set of files from the individual objects stored on the second storage tier.

As described, in some embodiments, the system may store a list of objects required to perform a full restore to the point-in-time of the first backup. Accordingly, in response to receiving the request to restore the files to the point-in-time of the first backup, the system may retrieve the list of objects from the metadata database, and identify the individual objects storing the backups of the first set of files and the shared objects storing the backups of the second set of files based on the retrieved list of objects.

In addition, as described, in some embodiments, the system may store an identifier for the second storage tier as a storage location of the individual objects storing the backup of the first set of files. Accordingly, the system may retrieve the storage location of the individual objects from the metadata database, in response to receiving the request to restore the files to the point-in-time of the first backup.

Figure 5:
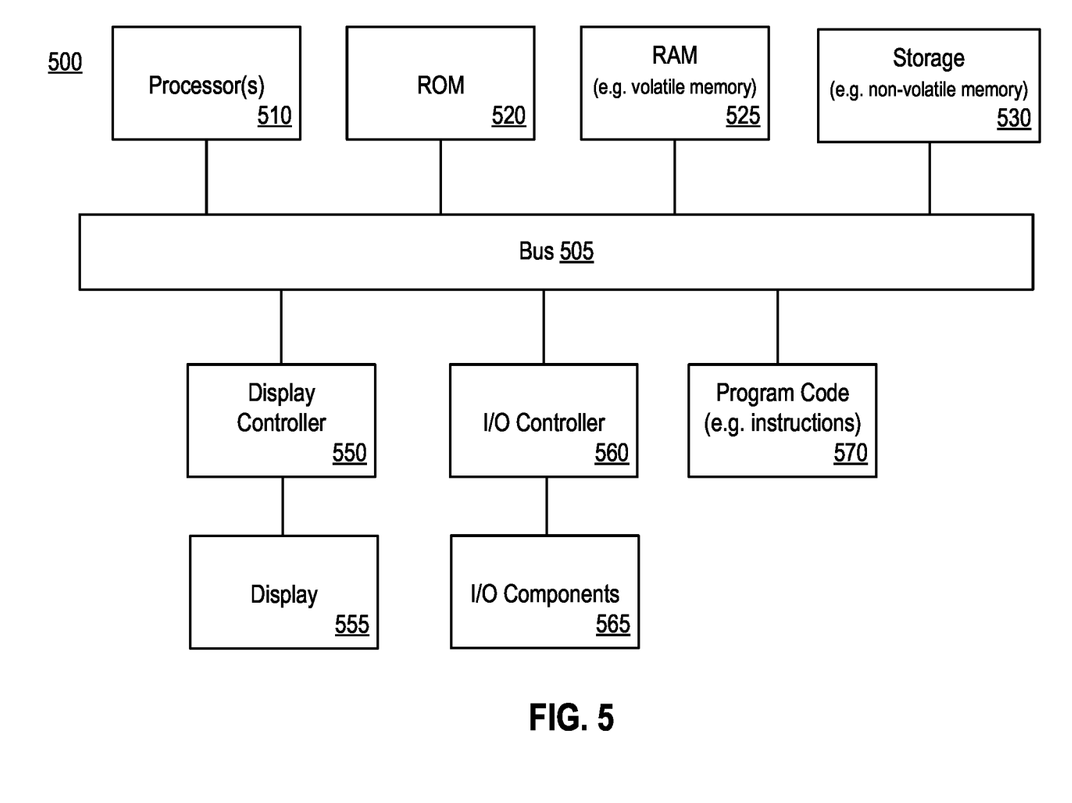
FIG. 5 is a block diagram illustrating an example of a computing system that may be used in conjunction with one or more embodiments of the disclosure.

FIG. 5 shows a block diagram of an example of a computing system that may be used in conjunction with one or more embodiments of the disclosure. For example, computing system 500 (or system, or server, or computing device, or device) may represent any of the devices or systems (e.g. server 120, client device 110, object storage 150, etc.) described herein that perform any of the processes, operations, or methods of the disclosure. Note that while the computing system 500 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 500 may include a bus 505 which may be coupled to a processor 510, ROM (Read Only Memory) 520, RAM (or volatile memory) 525, and storage (or non-volatile memory) 530. The processor(s) 510 may retrieve stored instructions from one or more of the memories 520, 525, and 530 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 510 may perform operations in an on-demand or "cloud computing" environment or as a service (e.g. within a "software as a service" (SaaS) implementation). Accordingly, the performance of operations may be distributed among the one or more processors 510, whether residing only within a single machine or deployed across a number of machines. For example, the one or more processors 510 may be located in a single geographic location (e.g. within a home environment, an office environment, or a server farm), or may be distributed across a number of geographic locations. The RAM 525 may be implemented as, for example, dynamic RAM (DRAM), or other types of memory that require power continually in order to refresh or maintain the data in the memory. Storage 530 may include, for example, magnetic, semiconductor, tape, optical, removable, non-removable, and other types of storage that maintain data even after power is removed from the system. It should be appreciated that storage 530 may be remote from the system (e.g. accessible via a network).

A display controller 550 may be coupled to the bus 505 in order to receive display data to be displayed on a display device 555, which can display any one of the user interface features or embodiments described herein and may be a local or a remote display device. The computing system 500 may also include one or more input/output (I/O) components 565 including mice, keyboards, touch screen, network interfaces, printers, speakers, and other devices. Typically, the input/output components 565 are coupled to the system through an input/output controller 560.

Program code 570 may represent any of the instructions, applications, software, libraries, toolkits, modules, components, engines, units, functions, logic, etc. as described herein (e.g. server 120, data manager 175, etc.). Program code 570 may reside, completely or at least partially, within the memories described herein (e.g. non-transitory computer-readable media), or within a processor during execution thereof by the computing system. Program code 570 may include both machine code, such as produced by a compiler, and files containing higher-level or intermediate code that may be executed by a computing system or other data processing apparatus (or machine) using an interpreter. In addition, program code 570 can be implemented as software, firmware, or functional circuitry within the computing system, or as combinations thereof. Program code 570 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (e.g. any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements. In addition, the use of the term "or" indicates an inclusive or (e.g. and/or) unless otherwise specified. For example, the phrase "at least one of x, y, or z" means any one of x, y, and z, as well as any combination thereof. In addition, the term "based on" is used to describe one or more factors that affect a determination. These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system comprising:
   one or more processors; and
   a non-transitory computer-readable medium storing a plurality of instructions, which when executed, cause the one or more processors to:
   receive a request to back up files stored on a client device to an object storage, the object storage including a first storage tier associated with a first storage cost and a second storage tier associated with a second storage cost less than the first storage cost;
   identify, amongst the files stored on the client device, a first set of files that are each larger than a predetermined size, and a second set of files that are each smaller than the predetermined size;
   identify one or more combination of files from the second set of files that when grouped together are within a range of the predetermined size;
   perform a first backup of the files stored on the client device by storing, on the first storage tier of the object storage, a backup of each file of the first set of files as an individual object, and a backup of each of the combinations of files from the second set of files as a shared object; and
   initiate a re-tiering of objects by moving the individual objects from the first storage tier to the second storage tier prior to performing a second backup subsequent to the first backup.

2. The system of claim 1, wherein the plurality of instructions, when executed, further cause the one or more processors to:
   receive a request to restore the files stored on the client device to a point-in-time of the first backup; and
   perform a full restore of the first set of files and the second set of files including retrieving the backups of the first set of files from the individual objects stored on the second storage tier.

3. The system of claim 2, wherein the plurality of instructions, when executed, further cause the one or more processors to:
   store, as part of a metadata database, a list of objects required to perform a full restore to the point-in-time of the first backup;
   retrieve the list of objects from the metadata database, in response to receiving the request to restore the files to the point-in-time of the first backup; and identify the individual objects storing the backups of the first set of files and the shared objects storing the backups of the second set of files based on the retrieved list of objects.

4. The system of claim 2, wherein the plurality of instructions, when executed, further cause the one or more processors to:
store, as part of a metadata database, an identifier for the second storage tier as a storage location of the individual objects storing the backup of the first set of files, in response to moving the individual objects from the first storage tier to the second storage tier; and
retrieve the storage location of the individual objects from the metadata database, in response to receiving the request to restore the files to the point-in-time of the first backup.

5. The system of claim 1, wherein the individual objects are stored as part of a bucket associated with the client device, and a name of the bucket includes an identifier for the client device and an identifier for a type of data stored by the files on the client device.

6. The system of claim 1, wherein the re-tiering of objects is initiated in response performing the first backup.

7. The system of claim 1, wherein the plurality of instructions, when executed, further cause the one or more processors to:
store, as part of a metadata database, identifiers of the backup of files stored in each of the shared objects, and offsets for the backup of files within each of the shared objects.

8. The system of claim 1, wherein the predetermined size is approximately 4 MB.

9. A method comprising:
receiving a request to back up files stored on a client device to an object storage, the object storage including a first storage tier associated with a first storage cost and a second storage tier associated with a second storage cost less than the first storage cost;
identifying, amongst the files stored on the client device, a first set of files that are each larger than a predetermined size, and a second set of files that are each smaller than the predetermined size;
identifying one or more combination of files from the second set of files that when grouped together are within a range of the predetermined size;
performing a first backup of the files stored on the client device by storing, on the first storage tier of the object storage, a backup of each file of the first set of files as an individual object, and a backup of each of the combinations of files from the second set of files as a shared object; and
initiating a re-tiering of objects by moving the individual objects from the first storage tier to the second storage tier prior to performing a second backup subsequent to the first backup.

10. The method of claim 9, further comprising:
receiving a request to restore the files stored on the client device to a point-in-time of the first backup; and
performing a full restore of the first set of files and the second set of files including retrieving the backups of the first set of files from the individual objects stored on the second storage tier.

11. The method of claim 10, further comprising:
storing, as part of a metadata database, a list of objects required to perform a full restore to the point-in-time of the first backup;
retrieving the list of objects from the metadata database, in response to receiving the request to restore the files to the point-in-time of the first backup; and
identifying the individual objects storing the backups of the first set of files and the shared objects storing the backups of the second set of files based on the retrieved list of objects.

12. The method of claim 10, further comprising:
storing, as part of a metadata database, an identifier for the second storage tier as a storage location of the individual objects storing the backup of the first set of files, in response to moving the individual objects from the first storage tier to the second storage tier; and
retrieving the storage location of the individual objects from the metadata database, in response to receiving the request to restore the files to the point-in-time of the first backup.

13. The method of claim 9, wherein the individual objects are stored as part of a bucket associated with the client device, and a name of the bucket includes an identifier for the client device and an identifier for a type of data stored by the files on the client device.

14. The method of claim 9, wherein the re-tiering of objects is initiated in response performing the first backup.

15. A computer program product comprising a non-transitory computer-readable medium having a computer-readable program code embodied therein to be executed by one or more processors, the program code including instructions to:
receive a request to back up files stored on a client device to an object storage, the object storage including a first storage tier associated with a first storage cost and a second storage tier associated with a second storage cost less than the first storage cost;
identify, amongst the files stored on the client device, a first set of files that are each larger than a predetermined size, and a second set of files that are each smaller than the predetermined size;
identify one or more combination of files from the second set of files that when grouped together are within a range of the predetermined size;
perform a first backup of the files stored on the client device by storing, on the first storage tier of the object storage, a backup of each file of the first set of files as an individual object, and a backup of each of the combinations of files from the second set of files as a shared object; and
initiate a re-tiering of objects by moving the individual objects from the first storage tier to the second storage tier prior to performing a second backup subsequent to the first backup.

16. The computer program product of claim 15, wherein the program code includes further instructions to:
receive a request to restore the files stored on the client device to a point-in-time of the first backup; and
perform a full restore of the first set of files and the second set of files including retrieving the backups of the first set of files from the individual objects stored on the second storage tier.

17. The computer program product of claim 16, wherein the program code includes further instructions to:
store, as part of a metadata database, a list of objects required to perform a full restore to the point-in-time of the first backup;
retrieve the list of objects from the metadata database, in response to receiving the request to restore the files to the point-in-time of the first backup; and identify the individual objects storing the backups of the first set of files and the shared objects storing the backups of the second set of files based on the retrieved list of objects.

18. The computer program product of claim 16, wherein the program code includes further instructions to:
store, as part of a metadata database, an identifier for the second storage tier as a storage location of the individual objects storing the backup of the first set of files, in response to moving the individual objects from the first storage tier to the second storage tier; and
retrieve the storage location of the individual objects from the metadata database, in response to receiving the request to restore the files to the point-in-time of the first backup.

19. The computer program product of claim 15, wherein the individual objects are stored as part of a bucket associated with the client device, and a name of the bucket includes an identifier for the client device and an identifier for a type of data stored by the files on the client device.

20. The computer program product of claim 15, wherein the re-tiering of objects is initiated in response performing the first backup.

\* \* \* \* \*